Patented Dec. 23, 1941

2,266,777

UNITED STATES PATENT OFFICE 2,266,777

POLYISOCYANATE DERIVATIVES OF POLYHYDROXY ALCOHOLS

Theodor Lieser, Halle, Saale, Germany

No Drawing. Application May 9, 1939, Serial No. 272,591. In Germany May 10, 1938

4 Claims. (Cl. 260—212)

The present invention relates to a process of producing high-molecular derivatives of polyhydroxy alcohols by linking the hydroxyl groups of polyhydroxy alcohols together to form large net-like molecules.

It is the primary object of this invention to spontaneously carry out this reaction at ordinary room temperatures without employing strong reagents, such as for example acids or alkalies.

A further object of this invention relates to a process of causing polyhydroxy alcohols, such as carbohydrates, cellulose, glycols, glycerols, etc. to react with adipyl diisocyanate or sebacyl diisocyanate at ordinary room temperatures.

Further objects of this invention will be apparent to those skilled in the art from a study of the following specification.

I am well aware that it has, heretofore, been proposed to introduce nitrogen into cellulose and cellulose derivatives by treating these materials with alkylisocyanates, arylisocyanates, etc. (See U. S. Patent No. 1,357,450 to Goissedet, U. S. Patent No. 1,892,489 to Haller, U. S. Patent No. 1,895,544 to Haller.)

By experimentation, I have unexpectedly found that adipyl diisocyanate or sebacyl diisocyanate react at normal room temperatures with polyhydroxy alcohols, such as carbohydrates, glycols, glycerols, etc., to form high-molecular, nitrogenous products. When reacting, for example adipyl diisocyanate or sebacyl diisocyanate with a glycol, a urethane is spontaneously produced in the form of a chain-like macro-molecule. Although valuable products may be obtained from polyhydroxy alcohols, such as glycols, glycerols, etc., I have found that high-molecular, chain-like products occurring in nature, such as cellulose and its derivatives are capable of being treated with the aforesaid isocyanates to form polymers, the physical characteristics of which differ from those of the original products. This is especially evident when the urethane formation takes place at normal room temperatures and with the exclusion of any violent reactions. As is well-known to those skilled in the art, rod-like high polymers are very sensitive towards temperature changes and energetic reagents, and it is for this reason that the novel process is especially valuable for the treatment of high-molecular polyhydroxy alcohols, such as cellulose, cellulose derivatives, etc. The addition of polyisocyanates to cellulose per se is somewhat incomplete. However, very remarkable results were obtained by the treatment of cellulose derivatives, such as for examples cellulose esters and ethers containing one or more free hydroxyl groups. Acetone-soluble cellulose acetate, for example, is a suitable raw material for my novel process. This acetyl cellulose when dissolved in an inert solvent, such as for example dioxane, forms upon addition of a polyisocyanate a substance insoluble in all organic solvents. This substance is evidently in accordance with its formation, its composition and its properties a net-like giant molecule having a molecular weight far in excess of that one of the original acetyl cellulose.

It is of interest to note that the undissolved cellulose acetate is also capable of reacting with polyisocyanates provided it contains at least one free hydroxyl group. The undissolved cellulose acetate forms likewise a product insoluble in all known organic solvents. Cellulose triacetate which is naturally devoid of free hydroxyl groups is of course incapable of reacting with the polyisocyanates.

Furthermore, I have found that in contradistinction to cellulose, any cellulose derivative having at least one free hydroxyl group can also easily react in solid form with polyisocyanates with the formation of net-like urethanes insoluble in inorganic and organic solvents.

Example I

Hexane-diol dissolved in dioxane is treated with a sufficient amount of adipyl diisocyanate dissolved in ether. A white precipitate separates from the solution. This precipitate is filtered, washed with alcohol and represents a polyurethane insoluble in all conventional solvents. It contains about 9% of nitrogen.

Example II

Commercial cellulose diacetate is dissolved in dioxane. Sebacyl diisocyanate, dissolved in dioxane, is added to the acetate solution. A gelatinous mass separates which becomes solid on standing. It is insoluble in all conventional solvents and contains up to about 4.5% of nitrogen. The nitrogen content varies in accordance with the amount of sebacyl diisocyanate used in the reaction.

Example III

Hydroxy-ethyl cellulose in anhydrous form, produced in conventional manner from alkali cellulose and ethylene oxide is treated with adipyl diisocyanate dissolved in ether. After completion of the reaction the hydroxy-ethyl cellulose becomes insoluble in all known organic solvents and contains about 5% of nitrogen.

Although these examples will serve to illustrate my invention, I wish to emphasize that the process is not limited to the polyhydroxy alcohols set forth therein, since I may make use of any polyhydroxy alcohol, i. e., any alcohol having two or more hydroxyl groups. Modifications of my invention will readily be recognized by those skilled in the art, and I desire to include all modifications coming within the scope of the appended claims.

What I claim is:

1. The process of introducing nitrogen into polyhydroxy alcohols which comprises causing a polyhydroxy alcohol to react with a polyisocyanate selected from the group consisting of adipyl diisocyanate and sebacyl diisocyanate.

2. The process of introducing nitrogen into polyhydroxy alcohols which comprises causing a carbohydrate to react with a polyisocyanate selected from the group consisting of adipyl diisocyanate and sebacyl diisocyanate.

3. The process of introducing nitrogen into polyhydroxy alcohols which comprises causing a cellulose to react with a polyisocyanate selected from the group consisting of adipyl diisocyanate and sebacyl diisocyanate.

4. The process of introducing nitrogen into polyhydroxy alcohols which comprises causing a cellulose derivative containing at least one free hydroxyl group to react with a polyisocyanate selected from the group consisting of adipyl diisocyanate and sebacyl diisocyanate.

THEODOR LIESER.